Jan. 4, 1966  D. A. OKUN ETAL  3,227,643
OXYGEN DETECTOR
Filed Nov. 13, 1962  2 Sheets-Sheet 1
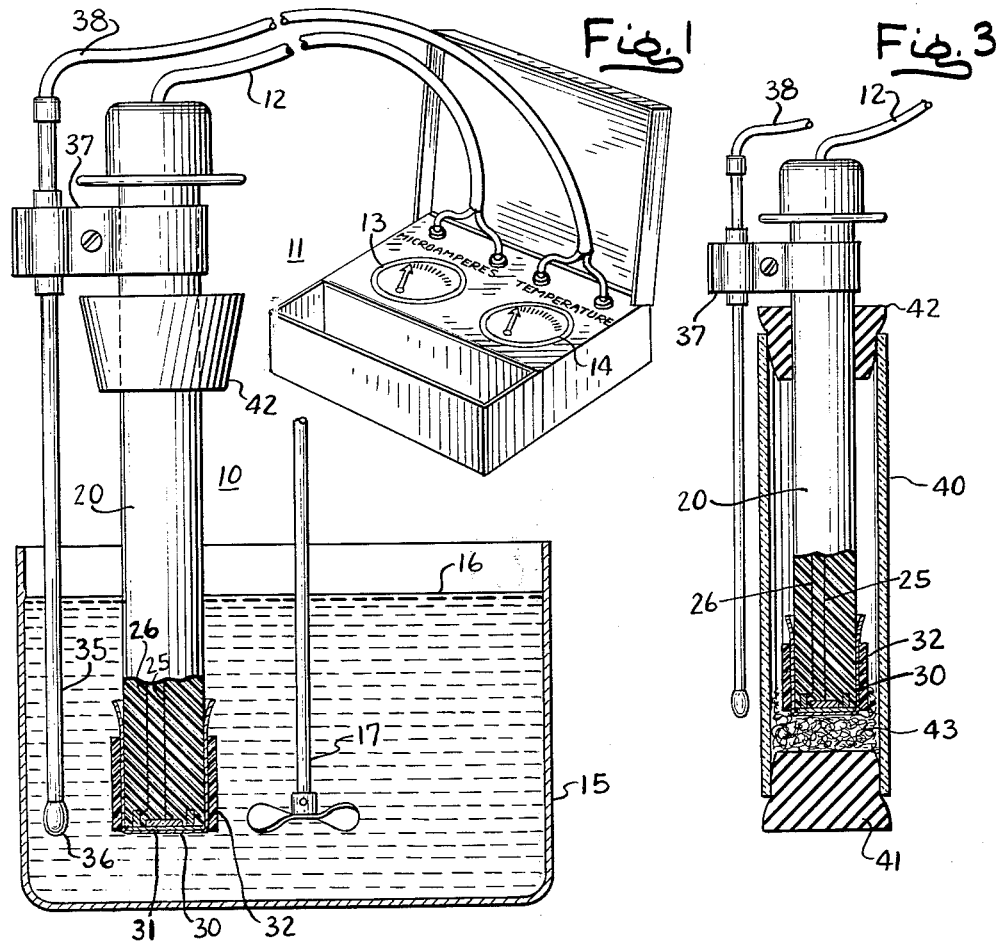
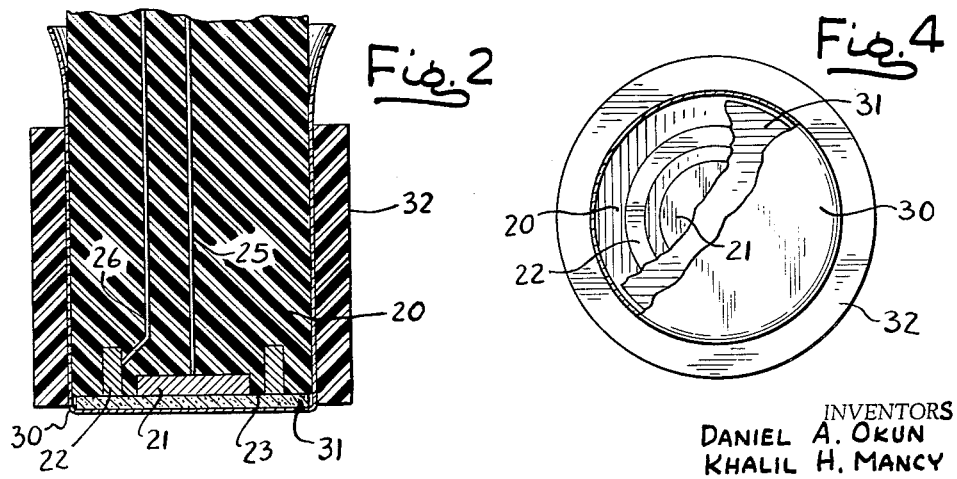
INVENTORS
DANIEL A. OKUN
KHALIL H. MANCY
CHARLES N. REILLEY
by: Wolfe, Hubbard, Voit & Osann
ATTYS.

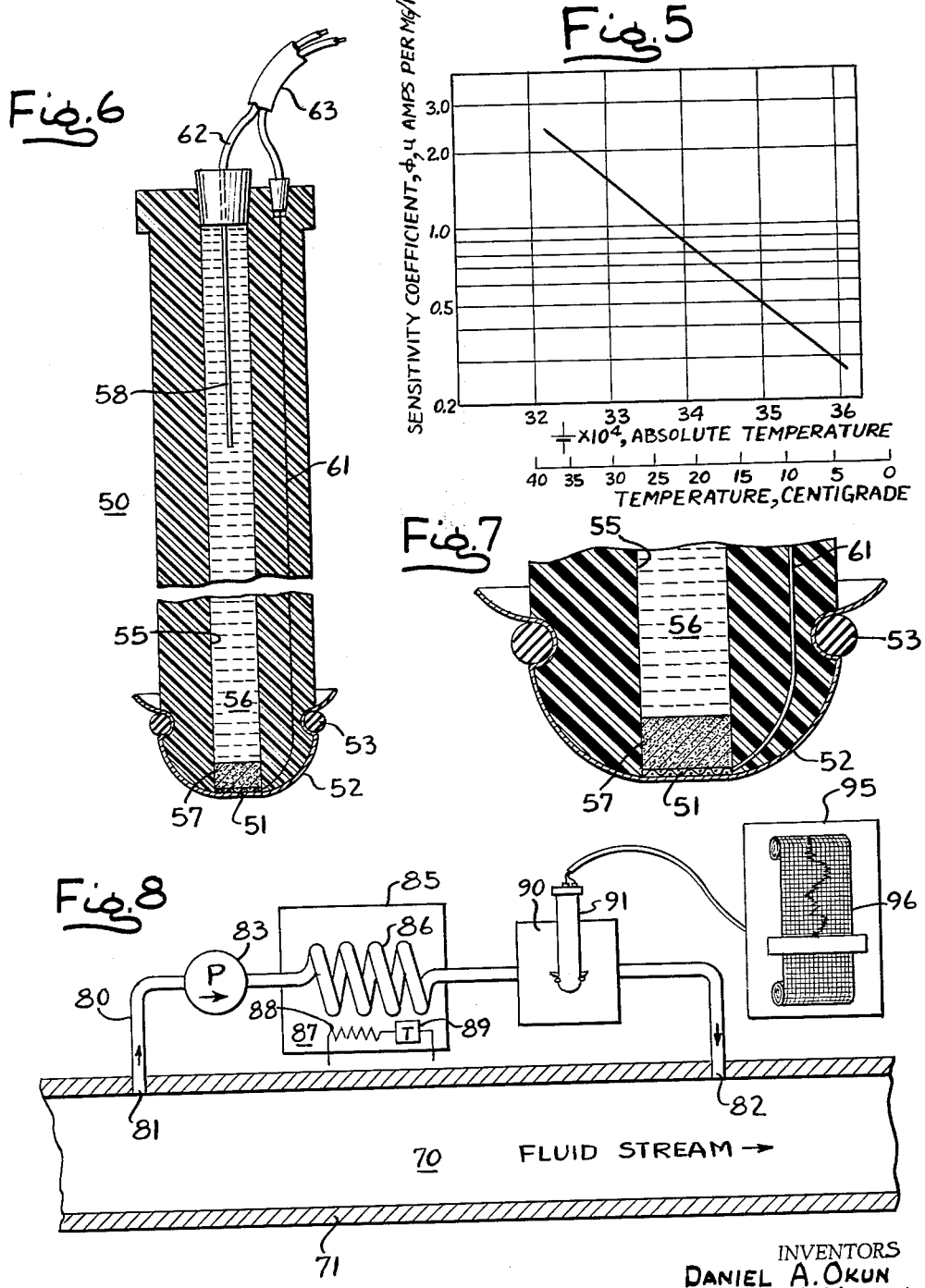

United States Patent Office 3,227,643
Patented Jan. 4, 1966

3,227,643
OXYGEN DETECTOR
Daniel A. Okun, Charles N. Reilley, and Khalil H. Mancy, Chapel Hill, N.C., assignors to The University of North Carolina, Chapel Hill, N.C.
Filed Nov. 13, 1962, Ser. No. 236,834
1 Claim. (Cl. 204—195)

The present invention relates to oxygen detectors and more particularly to an improved oxygen detector for quantitative measurement of oxygen concentration in a fluid sample or flowing stream.

Oxygen sensitive galvanic cells have been developed and in use since early in the nineteenth century. They have been mainly used, however, for generating electricity by depolarizing atmospheric oxygen from the inexhaustible supply in air and thus they have been given the name "Air Cells." Since the generated current from the air cell is directly proportional to the amount of oxygen consumed in the cell reaction, it was feasible to use such a system as an oxygen detector. Recently, oxygen sensitive galvanic cells have been used for oxygen determination in rivers and streams. In these systems, however, the galvanic couple is directly immersed in the test solution which makes it directly exposed to the poisoning effect of impurities which are commonly present in rivers and streams. This often resulted in non-reliable performance characteristics.

More recently, other oxygen detectors were developed. These are voltammetric systems which employ a pair of inert electrodes in contact with a supporting electrolyte and across which a specified applied voltage is maintained by an outer source of calibrated voltage and separated from the environment by a polymeric membrane, polyethylene or the like. However, all available oxygen detectors have been incapable of exhibiting stable performance characteristics, simplicity and general suitability for field use.

Accordingly it is the purpose of the present invention to provide an oxygen detector including an oxygen sensitive galvanic cell satisfying all of the known operating requirements and which avoids the disadvantages associated with conventional detectors. More specifically, it is an object to provide an oxygen detector which is highly sensitive yet which maintains its characteristics stably over long periods of time enabling the device to be used for continuous measurement. It is a related object to provide an oxygen detector which produces a reliably high output signal not requiring amplification and which may be therefore employed for direct driving of a galvanometer or microammeter and avoiding the expense of a calibrated voltage source.

It is an object to provide a novel probe for measuring both oxygen and temperature and which enables accurate measurement of successive samples in the shortest possible time.

It is another object to provide an oxygen detector in which the current reading is linearly related to oxygen concentration enabling use of simple temperature correction curves or nomographs or, by the use of calibrated resistors incorporated in the meter circuit, making it possible, where desired, to employ a conventional linearly calibrated microammeter having a scale which reads directly in terms of oxygen concentration. In this connection it is an object of the invention to provide a set up for continuous monitoring of the oxygen in a flowing stream without necessity for continuous temperature correction and in which the oxygen concentration is recorded in the form of a permanent chart.

It is also an object of the present invention to provide an oxygen detector which is quickly responsive and therefore capable of providing a continuous accurate indication of variations in oxygen in a flowing stream, a portion of which is directed past the detection cell.

It is a detailed object of the invention to provide an oxygen detector of an oxygen sensitive galvanic cell in which the electrodes are such that there is no undesired interaction between the electrodes and the electrolyte and which might tend to decompose the electrolyte. Moreover, the electrode materials are such as to maintain characteristics and operating efficiency in spite of continued contact with the electrolyte.

It is also a detailed object of the invention to provide an oxygen detector of certain geometry and specified electrode arrangement which is capable of maintaining stable performance characteristics.

It is a related object of the invention to provide means for storing the oxygen detector or probe so that its sensivity and calibration are maintained for long periods and which is particularly desirable where the device is employed at infrequent intervals in a research laboratory or the like.

It is one of the objects of the invention to provide a modified oxygen detector having a reservoir of electrolyte but which nevertheless has relatively rapid response and which tends to minimize the disadvantages normally associated with oxygen probes of the reservoir type.

Other objects and advantages of the invention will become apparent upon reading the attached detailed description and upon reference to the drawings in which:

FIGURE 1 is a view of an oxygen detector kit constructed in accordance with the present invention with the tip of the probe broken away to reveal the internal construction.

FIG. 2 is an enlarged cross section of the tip of the oxygen detector shown in FIG. 1.

FIG. 3 shows an oxygen detector assembled in its storage tube.

FIG. 4 is a face view of the tip of the oxygen detector with portions of the permeable film and the absorbent disc removed to show the profile of the electrodes.

FIG. 5 is a typical temperature calibration curve.

FIG. 6 is an axial section taken through a modified form of oxygen detector.

FIG. 7 shows a fragmentary enlargement of the tip of the detector shown in FIG. 6.

FIG. 8 is a diagram showing the manner in which the oxygen detector is employed for measuring oxygen detection in a continuously flowing stream.

While the invention has been described in connection with certain preferred embodiments, it will be understood that we do not intend to limit our invention to the embodiments shown but intend, on the contrary, to cover the alternative and equivalent constructions included within the spirit and scope of the appended claims.

Turning now to FIGS. 1–4 of the drawings, oxygen detecting apparatus is shown including a detector or probe 10 having an indicating unit 11 connected by a flexible cable 12. In the present instance the indicating unit includes a microammeter 13 and a temperature indicating meter 14. The detector is shown immersed in a beaker 15 containing a liquid 16 having an unknown concentration of dissolved oxygen. A stirring device 17 connected to a suitable power source maintains the liquid in motion so that the oxygen concentration in the immediate neighborhood of the detector is maintained at an equilibrium level.

In carrying out the invention the probe has a body 20 carrying at its tip or face a first electrode or cathode 21 in the form of a disc or a button of silver and a second electrode or anode 22 in the form of a ring of lead, the two electrodes being preferably concentric with one another and separated by a radial spacing 23. Connection is made to the first electrode by a wire 25 and to the second electrode by a wire 26, the wires and electrodes being preferably molded in place using a suitable plastic such as epoxy resin as the body material. In a practical case the tip of the probe is ground off, after molding, so that the entire face area of both electrodes is exposed.

For the purpose of admitting oxygen, and incidentally, other gases, while excluding the heavier liquid molecules, we provide, in the preferred embodiment, a membrane 30 formed of polyethylene of approximately 1.0 mil thickness. The membrane is stretched across the tip and held in place by a clamping ring 32 of flexible plastic, for example, a length of polyvinyl chloride tubing. For the purpose of defining an electrolyte space of constant and predetermined thickness adjacent the electrodes and for serving as a sponge to hold the electrolyte, we provide a disc 31 of lens tissue or equivalent. The preferred electrolyte is an aqueous solution of potassium hydroxide of molar concentration.

It is found that the above combination gives rise to a number of unforeseen features and advantages. In this arrangement, the lead ring, being the anode and at closed circuit more negative than the silver, reduces any oxygen molecules diffusing laterally in the supporting electrolyte and prevents them from reaching the silver cathode. Accordingly the anode acts as a "guard" protecting the cathode from the lateral diffusion of oxygen, which oxygen, consumed at the anode, does not contribute any current to the cathodic diffusion current. It follows then that the only oxygen reaching the silver cathode is that from the test solution, diffusing through the membrane, normal to the silver surface. By contrast, in voltammetric systems where a certain voltage is impressed between a platinum cathode and a silver anode surrounding it, the silver ring here does not act as does the lead in the galvanic cell and does not provide this protective quality; in such systems the above "edge effect" still exists. As a result the present oxygen detector is more responsive to changes in the oxygen content in the test solution. The construction also reduces the residual current and increases the life expectancy of the system.

It is one of the features of the construction that the clamping ring 32, which is non-oxygen permeable, extends all the way down to the face of the probe to prevent entry of oxygen through the side wall of the membrane 30.

The arrangement is not only highly sensitive so that the microammeter 13 may be driven directly by the current flowing between the electrodes, but the reading is directly proportional to the oxygen concentration in the sample. Because of the thin, predetermined dimension of the electrode space defined by the lens tissue 31, the device responds almost immediately to changes in the oxygen concentration. Moreover, the output characteristics are consistent and stable over long periods of time, even up to a matter of weeks, without replacement of the electrolyte.

The steady state current generated by this electrode system can be shown to be:

$$i_\infty = nFA\frac{P_m}{L}C_s$$

Where:

$i_\infty$ = steady state diffusion current in amperes.
$n$ = number of electrons involved in the electrode reaction per mole of the electroactive species.
$F$ = the faraday (96,500 coulombs).
$P_m$ = the permeability coefficient of the plastic membrane, cm.$^2$/sec.
$L$ = the thickness of the plastic membrane, cm.
$C_s$ = the concentration of oxygen in the test sample, moles/cm.$^3$ In a practical case the central cathode may have a diameter of ¼" and the encircling anode may have a radial thickness of 1/16" and an inner diameter of ⅜". Using these electrodes in a potassium hydroxide solution a meter 13 may be employed having a full scale reading of 60 microamperes. For purposes of temperature correction, i.e., to relate oxygen concentration and current at a given observation temperature, a correction curve such as shown in FIG. 5 may be employed.

In accordance with one of the more detailed features of the invention a temperature sensing element is directly connected to the probe and spaced slightly from the tip of it so as to be subjected to substantially the same fluid that is in contact with the membrane. Thus, referring to FIG. 1, a temperature probe 35 is provided having a temperature sensing element 36 at its tip in the form of a thermistor or the like. The temperature probe is preferably mounted on a bracket 37 so that the probe bodies are slightly spaced from one another. Electrical connection is made through a flexible cable 38 to provide a direct temperature indication at the indicator 14. Upon observing the temperature and electrode current, reference may be made to a chart such as that shown at FIG. 5 for accurate readings of oxygen concentration. Separate curves may be provided for more closely spaced temperature intervals or the readings may be interpolated between the curves shown. Because of the small mass of the thermistor element it has prompt response, on the order of 35 seconds for a 99% indication, a response comparable to that of the oxygen probe; thus a reliable oxygen reading may be taken just as soon as the temperature indication remains steady.

In accordance with one of the features of the present invention novel means are provided for protecting and storing the oxygen detector to insure that the characteristics are consistent from reading to reading over long intervals of non-use. Accordingly we provide a closed tube or receptacle for receiving the probe and provide a stopper on the body of the probe for sealing engagement with the mouth of the receptacle. As shown in FIG. 3, the storage tube may be in the form of a length of glass tubing enclosed at its lower end by a stopper 41 and at its upper end by a stopper 42 which forms a part of the probe. Or a bottle having an opening at one end may be used. In any event the storage chamber is charged with a small quantity of distilled water which may conveniently be absorbed in a wad 43 of fibrous or spongy material, for example, cotton. With the receptacle 40 thus sealed tight it is found that the probe may be stored almost indefinitely without loss of electrolyte or deterioration of the electrodes. The probe is ready for instant usage whenever required. The temperature probe, it will be noted, because of its outboard mounting above the stopper, remains outside of the storage tube.

While the detector described above is preferred because of prompt response to changes in oxygen concentration, and the other advantages already mentioned, the operating period may be further extended by providing a reservoir of electrolyte within the probe as illustrated in FIGS. 6 and 7. Here the probe indicated at 50 has a tip mounting a cathode in the form of a small foraminous disc 51 of silver gauze. Stretched over the tip of the probe is a membrane 52 held in place by an elastic ring 53. Such membrane may be of the same material as that previously discussed, preferably polyethylene. The probe has a central bore 55 containing a body of electrolyte 56. The body of electrolyte is separated from the electrode 51 by means of a porous plug 57 made of inert material, preferably porous glass, for example, the material known as Vycor prior to the shrinking step. For the purpose of completing the galvanic cell circuit a second electrode 58 is provided in the form of a lead wire which extends into the electrode above the plug. The two electrodes terminate in leads 61, 62 within a flexible cable 63 which extends to the current measuring apparatus. When the preferred materials, silver and lead, are employed, the device may be used for long periods without necessity for replenishment or removal of the membrane.

In accordance with one of the aspects of the present invention means are provided for utilizing the device to monitor the oxygen concentration in a continuously running fluid stream by diverting a portion of the stream through a bypassing conduit and adjusting its temperature to a reference value so that the oxygen content may be continuously recorded without necessity for temperature correction. Thus in FIG. 8 the fluid stream 70 is carried in a pipe or the like 71. Bypassing a length of the pipe is a conduit 80 having an inlet 81 and an outlet 82 spaced along the direction of flow. Preferably a positive displacement pump 83 is employed to insure a constant rate of flow. For the purpose of adjusting the temperature of the diverted fluid it is passed through a heat exchanger 85 having a coil 86 therein immered in a body of water or other suitable heat conducting liquid, the temperature of which is maintained constant at a reference value by a heating element 88 which is under the control of a thermostat 89. The fluid then passes through a test cell 90 having a probe 91 which may be constructed as described above. The current flow between the electrodes is continuously recorded in a recorder 95 to produce a chart 96 which is calibrated directly in terms of concentration.

It will be apparent to one skilled in the art that various changes may be made in the set up without departing from the invention. For example, the diverted fluid, instead of being returned to the stream may be separately discharged. Also the pump 83 may be dispensed with if the pressure drop in the pipe 71 is sufficient to cause diversion of a portion of the fluid through the conduit 80 and relatively constant in value.

In the above discussion the preferred electrode geometry and materials have been disclosed which, when used in combination, bring about a disproportionate improvement in the result obtained. However, it will be appreciated by one skilled in the art that other specific materials may be substituted with some sacrifice in operating capability. Specifically, gold or carbon may be employed as the cathode material. Alternate anode materials are cadmium and zinc. Metal alloys can also be used. Where lead is used, and where it is desired to reduce local action to the absolute minimum, the electrode may be coated with a mercury amalgam by immersing the bright lead surface in mercury for a short period of time, on the order of 30 or 40 seconds. Also while a solution of potassium hydroxide is preferred as the electrolyte, the detector is capable of operating using other strong electrolytes e.g. potassium chloride, sulfuric acid and potassium carbonate. It is also possible to add to the supporting electrolyte certain chelating agents, for example EDTA, which will combine with the cell reaction products and this will result in more stable performance characteristics as well as longer service from the galvanic system. And while polyethylene is the preferred membrane material, other membranes may be employed with some sacrifice in the result, for example, polypropylene. Irradiated polyethylene available from the Cryovac Division of the W. R. Grace Company has been found to have a high degree of oxygen permeability.

While the invention has been described in connection with measurement of dissolved oxygen in a liquid, it will be understood that the detector may also be used without any substantial change for measurement of oxygen concentration in a gas and nonaqueous fluids. Where continuous operation over a long period of time is required, the embodiment shown in FIGS. 6 and 7 is particularly suitable since the large quantity of electrolyte available tends to defeat the effect of evaporation.

Combining the oxygen and temperature-measuring functions in a single probe as in FIGS. 1 and 3 not only insures simultaneous readings for maximum accuracy but also makes it possible to take readings for a large number of samples in quick succession.

We claim as our invention:

In an oxygen detector the combination comprising a probe having a tip, said probe having a silver electrode at said tip, a selectively permeable membrane stretched over said tip to separate the silver electrode from the fluid in which the probe may be immersed, said probe being of hollow construction defining an electrolyte space therein containing an aqueous solution of potassium hydroxide, an inert porous plug interposed between the electrolyte space and the silver electrode for maintaining the face of the electrode wetted with electrolyte, a return electrode of lead in said electrolyte space to complete an oxygen sensitive galvanic cell, said electrodes having leads providing external electrical connections, and means connected to said electrodes for measuring the generated current flow between them when the probe is immersed in a fluid containing dissolved oxygen.

References Cited by the Examiner

UNITED STATES PATENTS

| | | | |
|---|---|---|---|
| 2,414,411 | 1/1947 | Marks | 204—1.1 |
| 2,651,612 | 9/1953 | Haller | 204—195 |
| 2,913,386 | 11/1959 | Clark | 204—195 |
| 2,943,028 | 6/1960 | Thayer et al. | 204—195 |
| 3,000,805 | 9/1961 | Carritt et al. | 204—195 |
| 3,051,631 | 8/1962 | Harbin et al. | 204—195 |
| 3,070,539 | 12/1962 | Arthur et al. | 204—195 |
| 3,071,530 | 1/1963 | Neville | 204—195 |
| 3,088,905 | 5/1963 | Glover | 204—195 |
| 3,098,813 | 7/1963 | Beebee et al. | 204—195 |

JOHN H. MACK, *Primary Examiner.*

MURRAY TILLMAN, WINSTON A. DOUGLAS,
*Examiners.*